United States Patent [19]
Allen

[11] Patent Number: 5,154,004

[45] Date of Patent: Oct. 13, 1992

[54] PROPORTIONAL DIVIDER

[76] Inventor: James Q. Allen, 1008 N. Polk St., Amarillo, Tex. 79107

[21] Appl. No.: 795,836

[22] Filed: Nov. 21, 1991

[51] Int. Cl.$^5$ .............................................. G01B 3/16
[52] U.S. Cl. .................................................. 33/558.02
[58] Field of Search .......... 33/558.02, 558.03, 558.04, 33/25.2, 458, 419, 464, 495, 478, 470, 472, 473

[56] References Cited

U.S. PATENT DOCUMENTS

| | | | |
|---|---|---|---|
| 2,560,697 | 7/1951 | Joy | 33/558.02 |
| 2,645,021 | 7/1953 | Dierkes | 33/558.02 |
| 2,770,884 | 11/1956 | Eckert et al. | 33/558.02 |

FOREIGN PATENT DOCUMENTS

| | | | |
|---|---|---|---|
| 1091460 | 10/1954 | France | 33/458 |
| 116377 | 5/1946 | Sweden | 33/25.2 |

Primary Examiner—Harry N. Haroian
Attorney, Agent, or Firm—Richard C. Litman

[57] ABSTRACT

A proportional divider is provided with two leg members connected by a slidable pivot assembly. The slidable pivot assembly is frictionally attached to each leg member by a shallow u-shaped member. The distal ends of the leg members taper to a point. Both leg members are solid, integral, and of one piece construction. A proportional scale is provided on the leg members.

6 Claims, 2 Drawing Sheets 5,154,004

PROPORTIONAL DIVIDER

FIELD OF THE INVENTION

The present invention relates to proportional dividers. More specifically the present invention relates to frictionally held slidable pivot assemblies for connecting two elongate members.

DESCRIPTION OF THE PRIOR ART

Proportional dividers and devices used for the transfer of dimensions of an object in a reduced scale are known in the art. U.S. Pat. No. 1,321,924 issued to Kuldell discloses a plotting instrument. This plotting device has two leg members connected by a pivot assembly. The pivot assembly is secured by an adjustable clamp. A cut is made in the center of the leg members to permit the pivot assembly to be held in place.

U.S. Pat. No. 1,768,679 issued to Gasstrom discloses an extensible ruler. The ruler has a two piece rectangular pivot secured in place at the end of each of a multiple number of interconnected leg members.

U.S. Pat. No. 2,478,198 issued to D. M. Kroener discloses another rule device. This device has a pivotal member attached firmly to each member which allows the ruler to fold and unfold.

U.S. Pat. No. 2,510,805 issued to Dewey discloses an extensible tip for dividers. A complex pivot assembly is attached to a slot which is centrally disposed in each of a pair of elongate leg members. The two tips of the legs have a point member which is of adjustable length.

U.S. Pat. No. 2,560,697 issued to Joy discloses a proportional divider. It is comprised of two leg members each having a pointed end. The two leg members are connected by a circular pivot assembly. The pivot assembly is secured to the leg members in a slidable fashion and is held in place by a clamping nut and a spring disk.

U.S. Pat. No. 2,645,021 discloses a proportional divider with a pivot assembly. The pivot assembly locks in one of a series of discrete points along the leg members. The lock down assembly is secured in one of the discrete point areas by a wingnut pushing a circular peg into a circular hole disposed at the discreet point area.

None of the above referenced devices, considered either singly or in combination, is seen to suggest the instant invention as claimed.

SUMMARY OF THE INVENTION

The proportional divider of the instant invention comprises a pair of elongate leg members connected by a slidable pivot assembly. This pivot assembly is frictionally attached to the two leg members and can slide along substantially the entire length of the two elongate leg members which permits the two leg members to rotate about each other at the point defined by the pivot assemblies' current location.

Accordingly, one object of the present invention is to provide an inexpensive and simple to use proportional divider.

Another object of the present assembly is to provide a proportional divider with a pivot assembly which is frictionally attached to the elongate leg members.

Another object of the present invention is to provide a proportional divider with a slidable pivot assembly which can be placed at any location along the elongate leg members.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1A:
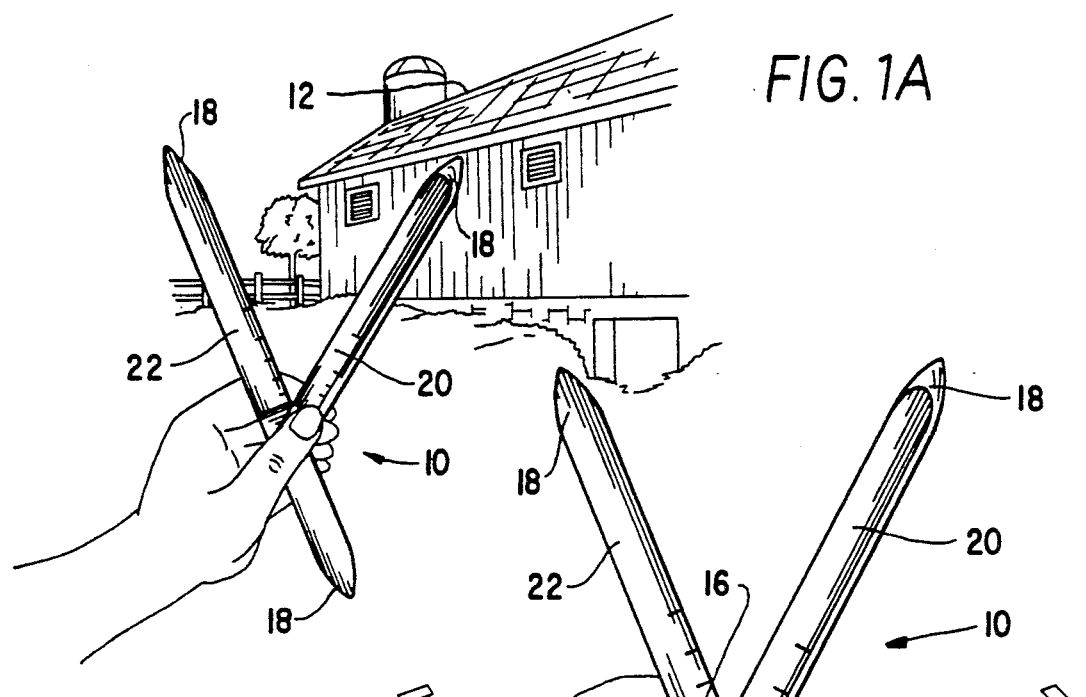
FIG. 1A discloses an environmental perspective view showing the proportional divider in use as a sighter.
Figure 1B:
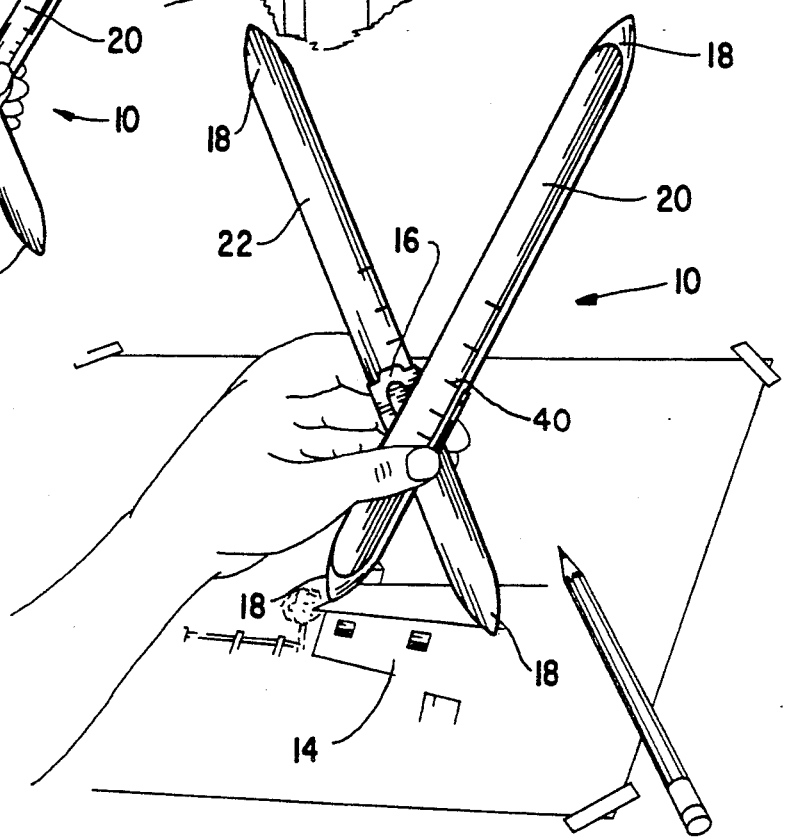
FIG. 1B discloses an environmental perspective view showing the proportional divider in use for scaling down a sighting.

The present invention is drawn to a proportional divider 10. One of the many functions that a proportional divider 10 provides is the transference of dimensions, that is, it permits one to draw an object to a precise reduced scale. The proportional divider 10 of the present invention is shown in one of its many uses in FIGS. 1A and 1B. These Figures show the proportional divider 10 being used to transfer the proportional dimensions of a house 12 in the environment to a view of house 14 drawn on paper in a reduced scale. The proportional divider 10 can be used in many different applications, including but not limited to art, architecture and sculpture.

Figure 2:
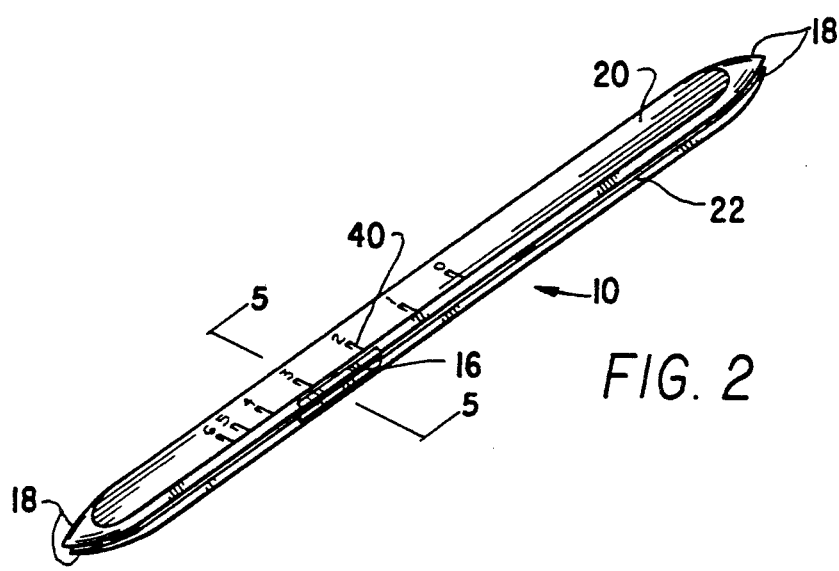
FIG. 2 discloses a perspective view of the proportional divider in the closed position.
Figure 3:
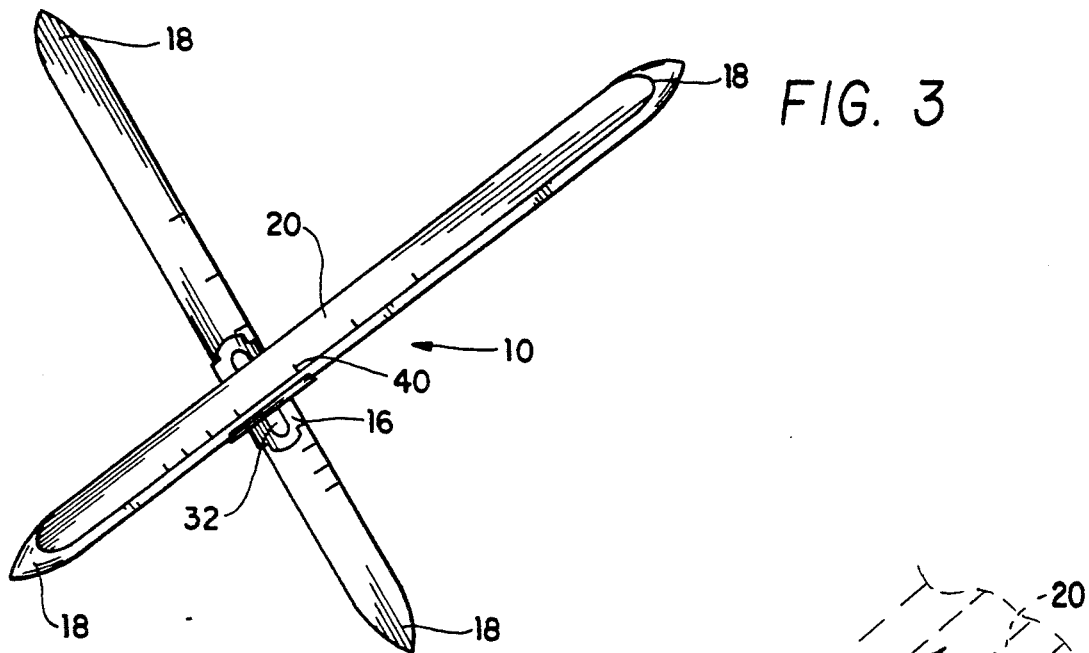
FIG. 3 discloses a perspective view of the proportional divider in the open position.

The proportional divider 10 consists of a top leg 20 and a bottom leg 22, connected by a slidable pivot assembly 16. At the distal end of both the top leg 20 and the bottom leg 22 a pointed distal section 18 is provided. The proportional divider 10 is shown in closed position in FIG. 2 and in an open position in FIG. 3. By varying the position of the pivot assembly 16 one can transfer any ratio of proportions not just integral multiples of proportion. Indicia 40 indicating the ratio of dimension reduction is provided on the top leg 20 and the bottom leg 22.

Figure 4:
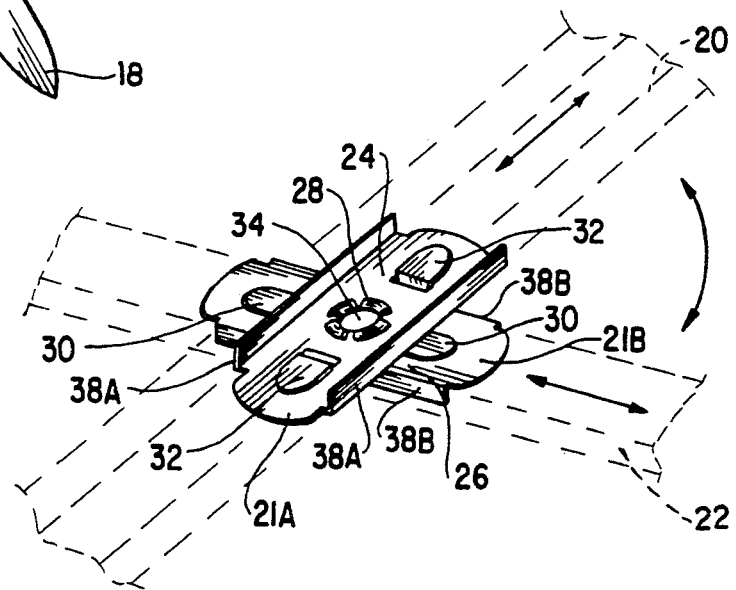
FIG. 4 is a perspective top view of the pivot between the two legs of the proportional divider.
Figure 5:
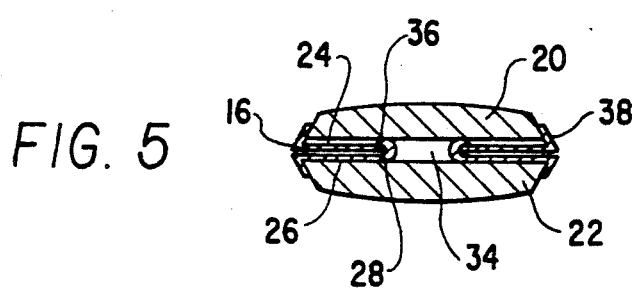
FIG. 5 is a sectional view of the pivot taken along line 5—5 of FIG. 2.

FIG. 4 shows a perspective view of the slidable pivot assembly 16. The slidable pivot assembly 16 comprises two generally rectangular pieces 21A and 21B with flange elements 38. A top portion 24 and a bottom portion 26 of the pivot assembly 16 are connected by a primary pivot mechanism 28. The bottom portion 26 has two detent leafs 30 which either interlock in a mating fashion or when unlocked by rotation produces frictional resistance with two detent receptacles 32 located on the top portion 24. This interlocking feature permits rotation when rotational force is applied and stability when no force is applied.

The primary pivot mechanism 28 consists of a punched hole 34 through the top portion 24 and bottom portion 26 of the pivot assembly 16. The punched material 36 from the bottom portion 26 is deformed about the opening in the top portion 24. This deformed punched material 36 secures the top portion 24 to the bottom portion 26 in such a fashion whereby rotation can be initiated between the top portion 24 and the bottom portion 26.

Both the top portion 24 and the bottom portion 26 have two flange members 38A and 38B which connect to the top leg 20 and the bottom leg 22, respectively, of the proportional divider 10. These flange members 38A and 38B are tensioned against the top leg 20 and bottom leg 22 in such a manner to permit sliding when a great enough force is applied and to hold the pivot assembly 16 in place when no force is applied. This permits adjustment of the pivot assembly 16 anywhere on the top/bottom legs (20, 22) of the proportional divider 10.

It is to be understood that the present invention is not limited to the sole embodiment described above, but encompasses any and all embodiments within the scope of the following claims.

I claim:

1. A proportional divider comprising a pair of substantially elongate leg members pivotally interconnected to one another, each leg having a shaped distal end, said members being pivotally interconnected by a pivot assembly, said assembly being slidable along said members, said pivot assembly includes a first and a second substantially rectangular sides, each said first and second rectangular side is slidably connected to a respective one of said elongate leg members by a pair of flanges, said flanges and said rectangular sides forming a shallow U-shaped member, said first rectangular side having a first and second detent leaf located thereon, said second rectangular side having a first and a second detent receptacle located thereon, wherein said detent leafs and said detent receptacles interlock in a mating fashion, and whereby said leg members can be rotated about said pivot assembly at any point intermediate said distal ends.

2. A proportional divider as claimed in claim 1 wherein said elongate leg members are solid and have a substantially flat surface area.

3. A proportional divider as claimed in claim 1 wherein said distal ends are integral with said elongate leg members.

4. A proportion divider as claimed in claim 1 wherein said pivot assembly is slidably connected to said leg members by said flanges, said flanges and said leg members being held together by a frictional force.

5. A proportional divider as claimed in claim 1 wherein indicia representing a proportional scale is located on said elongate leg members.

6. A device comprising a pair of substantially elongate leg members pivotally interconnected to one another, each leg member having a distal end, said members being pivotally interconnected by a pivot assembly, said assembly being slidable along said members, said pivot assembly includes a first and a second substantially rectangular sides, each said first and second rectangular side is slidably connected to a respective one of said elongate leg members by a pair of flanges, said flanges and said rectangular sides forming a shallow U-shaped member, said first rectangular side having a first and second detent leaf located thereon, said second rectangular side having a first and a second detent receptacle located thereon, wherein said detent leafs and said detent receptacles interlock in a mating fashion, and whereby said leg members can be rotated about said pivot assembly at any point intermediate said distal end.

* * * * *